(12) United States Patent
Ichikawa

(10) Patent No.: US 6,526,940 B2
(45) Date of Patent: Mar. 4, 2003

(54) MULTIPLE INTAKE VALVE ENGINE

(75) Inventor: Hiroyuki Ichikawa, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 35 days.

(21) Appl. No.: 09/741,472

(22) Filed: Dec. 19, 2000

(65) Prior Publication Data

US 2001/0006056 A1 Jul. 5, 2001

(30) Foreign Application Priority Data

Dec. 24, 1999 (JP) .............................. 11-367404
Aug. 28, 2000 (JP) ........................ 2000-263246

(51) Int. Cl.[7] .............................................. F02B 31/00
(52) U.S. Cl. ................................ 123/308; 123/188.14
(58) Field of Search ........................... 123/188.14, 308, 123/432

(56) References Cited

U.S. PATENT DOCUMENTS

| | | | | |
|---|---|---|---|---|
| 3,903,849 A | * | 9/1975 | List et al. | 123/308 |
| 4,854,291 A | | 8/1989 | Elsbett | 123/568.13 |
| 5,291,865 A | * | 3/1994 | Sasali | 123/308 X |
| 5,479,889 A | * | 1/1996 | Sato et al. | 123/308 |
| 5,906,183 A | * | 5/1999 | Echtle et al. | 123/308 X |
| 6,003,485 A | | 12/1999 | Kawashima | 123/188.14 |

FOREIGN PATENT DOCUMENTS

| | | |
|---|---|---|
| DE | 27 10 321 | 9/1978 |
| JP | 61104119 | 5/1986 |
| JP | 06288239 A | 10/1994 |
| JP | 06288240 A | 10/1994 |
| JP | 07158459 A | 6/1995 |
| JP | 08158873 A | 6/1996 |
| JP | 10037751 A | 2/1998 |

* cited by examiner

*Primary Examiner*—Tony M. Argenbright
(74) *Attorney, Agent, or Firm*—McCormick, Paulding & Huber LLP (57) ABSTRACT

A multiple intake valve engine has a first intake port (1) and second intake port (2). The first intake port (1) has an outlet (7), and the second intake port (2) has an outlet (8). The first intake port (1) is provided upstream of the second intake port (2) with respect to a swirl (S) generated in a respective cylinder (3) of the engine. A near-outlet part (16) of the first intake port (1) is directed toward an area (A) between the second intake port outlet (8) and a cylinder inner wall (12a) located on the upstream side of this outlet (8) in the direction of the axis (Cp) of the second intake port (2). A powerful swirl (S) is generated under all circumstances, and the swirl (S) is strengthened without sacrificing an amount of intake air.

24 Claims, 10 Drawing Sheets

X-X-CROSS SECTION

MULTIPLE INTAKE VALVE ENGINE

BACKGROUND OF THE INVENTION

1. Field of the Invention

The present invention relates to a multiple intake valve engine having two or more intake valves per cylinder.

2. Description of the Related Art

In the field of engine design, multiple intake valves are often employed to improve the shape, size, arrangement, and so forth of the various intake ports, and thereby enhance the intake efficiency, maximum intake quantity, swirl characteristics, and so on.

Figure 9:
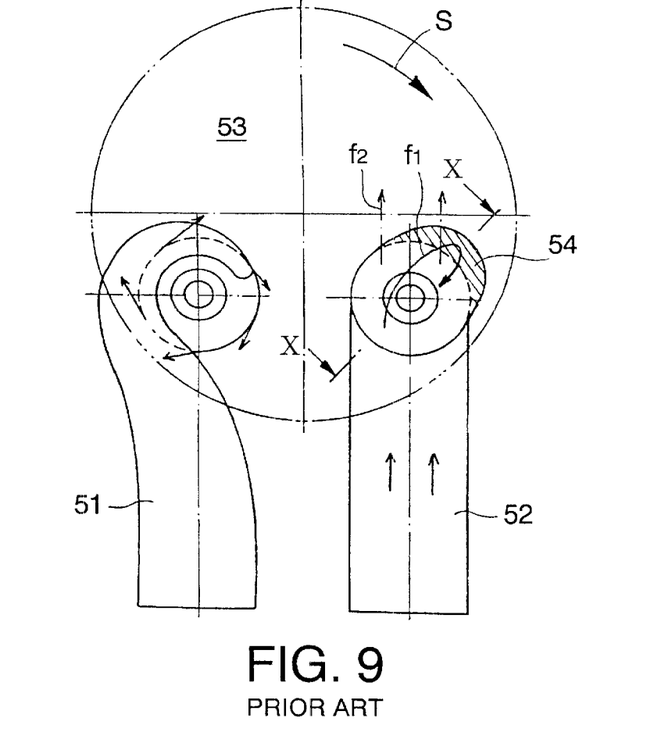
FIG. 9 illustrates a plan view of a conventional multiple intake valve engine.
Figure 10:
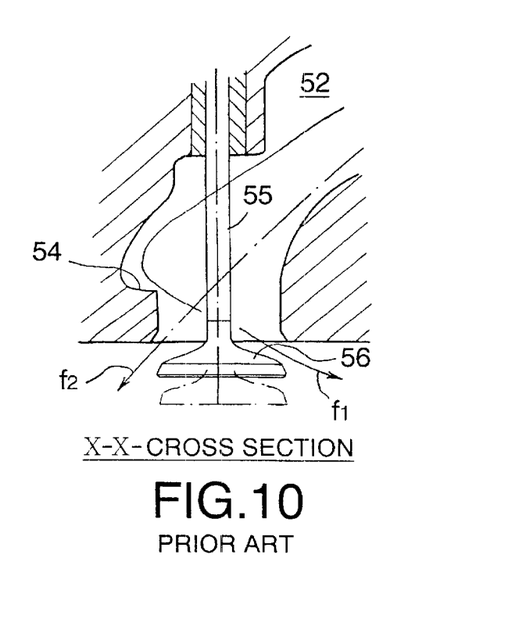
FIG. 10 is a cross section along the X—X line in FIG. 9.
Figure 11:
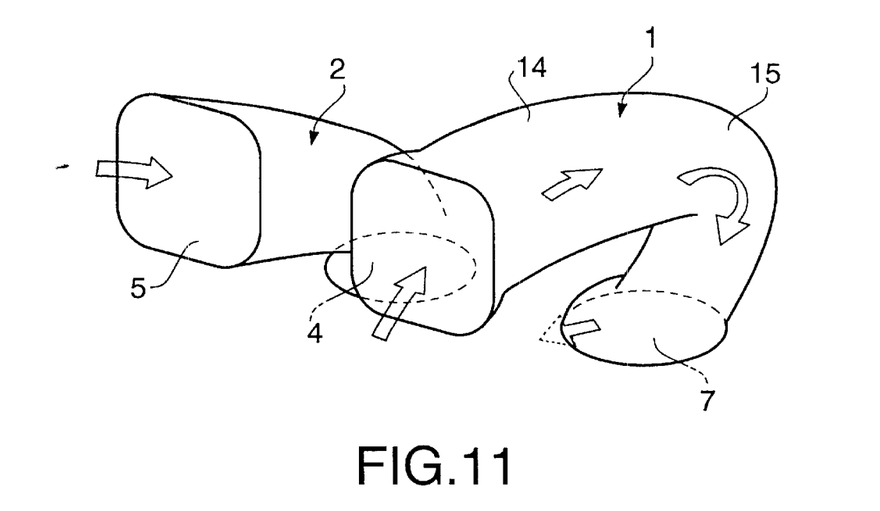
FIG. 11 is a perspective view of a multiple intake valve engine pertaining to another embodiment of the present invention.

An example of multiple intake valve engine is disclosed in Japanese Patent Application Laid-Open Publication No. 6-288239 and shown in FIGS. 9 and 10 of the accompanying drawings. With this multiple intake valve engine, two intake ports 51 and 52 are formed generally in parallel for a respective cylinder, the one intake port 51 is a helical port which charges a spiral flow into the cylinder 53, and the other intake port 52 has a recess 54 at a location immediately before the outlet of the other intake port 52 such that the charge within the port is blown back in the opposite direction by this recess 54. The synergistic effect of these flows of intake air produces and augments a swirl S within the cylinder.

However, the following problems are encountered with the intake port 52. Because the intake flow collides with the recess 54, there is a drop in the flow rate of the charge, so intake efficiency suffers. Also, when the valve lift of the intake valve 55 is small as indicated by the solid lines in FIG. 10, the port outlet is blocked by the umbrella-like head 56 of the intake valve 55, so the charge is deflected by the valve head 56 and flows along a desired route, as indicated by the arrow fi. When the valve lift of the intake valve 55 increases as indicated by the imaginary line, however, the blockage by the valve head 56 is eliminated, and the charge flows straight out along the shortest route, as indicated by the arrow $f_2$, which conversely has the effect of canceling out the swirl S. This tendency is more pronounced at high engine speeds, i.e., when the intake flow rate is higher and the inertia of the charge is stronger.

As a remedy for this, Japanese Patent Application Laid-Open Publication No. 10-37751 discloses a technique of intentionally reducing the intake valve lift when this swirl-weakening flow of air (charge) occurs. This system, however, is undesirable in that the performance originally had by the intake port outlet is not fully taken advantage of. Specifically, there is a substantial decrease in outlet area, the maximum intake quantity is reduced, and so on. Thus, a powerful swirl could not always be obtained under all circumstances with a conventional intake port arrangement. It was also difficult to achieve an increase in swirl without sacrificing intake quantity.

SUMMARY OF THE INVENTION

An object of the present invention is to overcome the above described problems of the conventional arrangements.

According to one aspect of the present invention, there is provided a multiple intake valve engine including a first intake port with a first outlet, and a second intake port with a second outlet and being provided downstream of the first intake port with respect to a swirl generated in a respective cylinder of the engine. A near-outlet part of the first intake port, which is positioned immediately before the first outlet, is directed toward a cylinder inner wall in the upstream vicinity of the second intake port outlet with respect to the swirl such that the charge from the first intake port is directed to the above-mentioned cylinder inner wall. In other words, the charge from the first intake port is oriented to a dead space in the cylinder between the first and second intake port outlets.

The first intake port may extend in a generally "L" shape such that an intake air flowing in the first intake port is turned by between 90° and 150°, when viewed in plan view, toward the cylinder inner wall upstream of the second intake port outlet when it leaves the first intake port outlet. This angle of between 90° and 150° may be primarily determined by the near-outlet part of the first intake port.

The first intake port may have an inlet section extending downstream from an inlet of the first intake port, and a middle section extending downstream from the inlet section to the near-outlet part, and the middle section may curve in a generally C-shape away from the second intake port and protrude with respect to the generally straight inlet section when viewed from the top. The C-shape of the middle section may be turned counterclockwise to a certain extent with respect to the first intake port axial direction so that it becomes close to "U", and the turning bottom of this "U" approaches a cylinder center. The maximum offset length of the middle section with respect to the first intake port inlet section (or first intake port axial direction) may be at least 0.5 W but no more than 0.75 W, where W is the inlet width of the first intake port. The inner surface of the first intake port is preferably formed as a smooth surface over its entire length. The cross sectional shape of the near-outlet part of the first intake port may have an oval shape.

Preferably, the second intake port is a straight tangential port, and in the vicinity of the outlet thereof, the second intake port is constricted so as to have a passage deflected on the opposite side from the first intake port.

The height location of the first intake port inlet may be higher than the first intake port outlet. The middle section of the first intake port may curve downward. Preferably, the first intake port outlet is formed below a line passing through an uppermost point of the first intake port inlet and touching a lowermost corner point defined by the downwardly curved middle section. The height location of the first intake port inlet may be lower than or equal to the height location of the second intake port inlet.

DETAILED DESCRIPTION OF THE INVENTION

Preferred embodiments of the present invention will now be described through reference to the appended figures.

FIGS. 1 to 6 show an multiple intake valve arrangement according to the present invention, and particularly illustrate flows of intake air in a plurality of intake ports for one of cylinders of an engine. Two intake ports per cylinder are provided, namely, a first intake port 1 and a second intake port 2. Although these intake ports 1 and 2 are depicted liked pipes, they are actually formed simultaneously within a cylinder head during its casting. Similarly, only the shape of the cylinder 3 is shown. Although not depicted, this engine is a four-valve engine, with two exhaust ports and two intake ports provided per cylinder. The engine also has a plurality of cylinders 3, but only one of them is illustrated.

Figure 1:
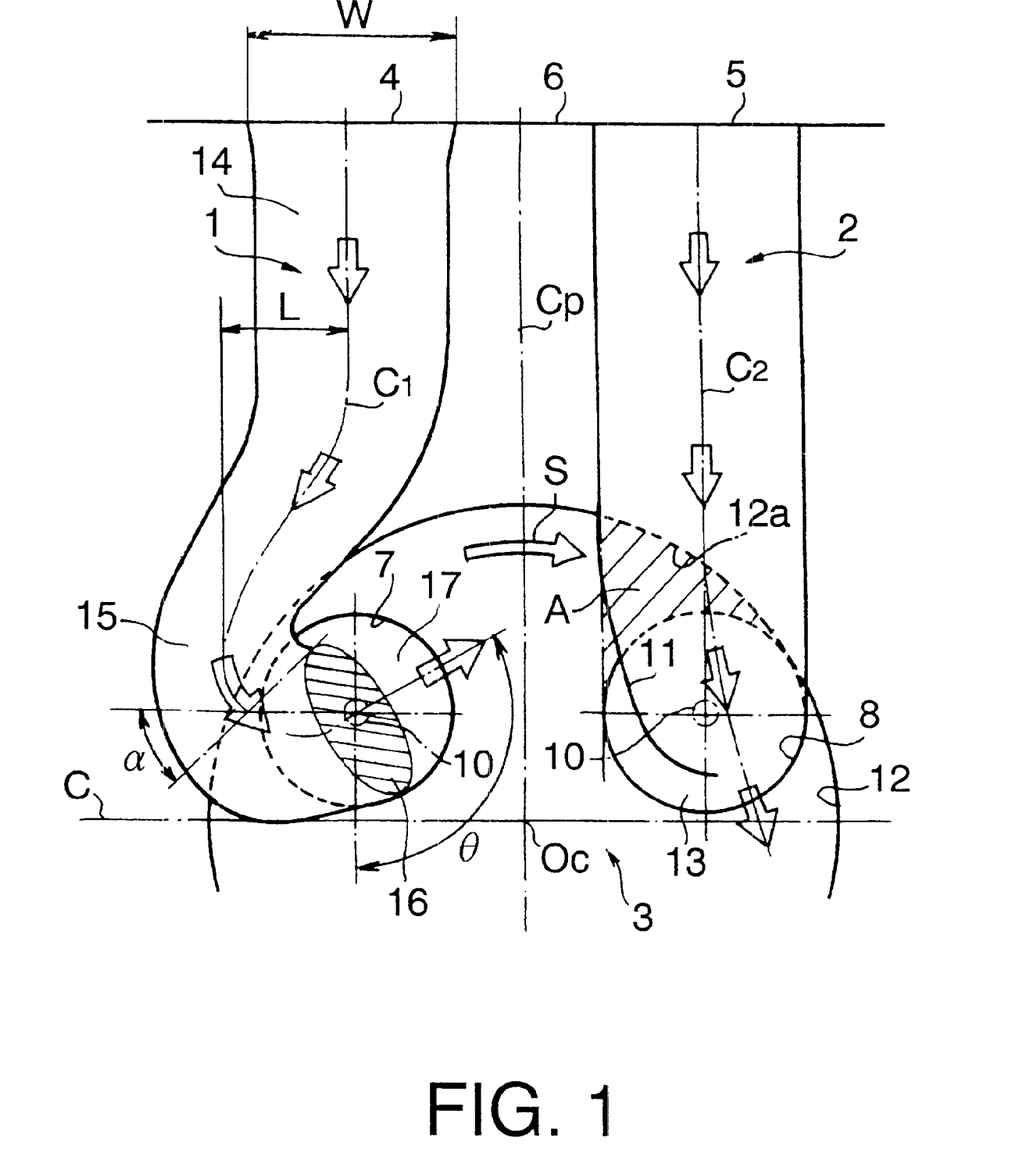
FIG. 1 illustrates a plan view of a multiple intake valve engine pertaining to an embodiment of the present invention.
Figure 2:
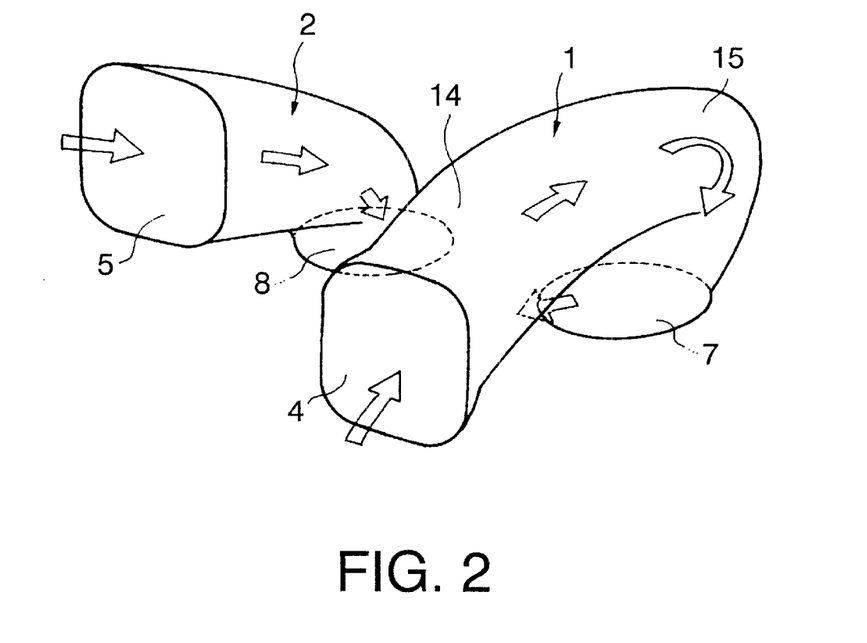
FIG. 2 is an oblique view of the engine shown in FIG. 1.

In FIG. 1, Oc is the cylinder center, C is the crankshaft center, $C_1$ is the center line of the first intake port 1, $C_2$ is the center line of the second intake port 2, Cp is the intake port axis, and S is the swirl in the cylinder 3. The term "intake port axis" as used here refers to a straight line simply connecting the outlet center and inlet center of the intake port in plan view as in FIG. 1. It should be noted that in the illustrated embodiment the intake port axis for each intake port 1, 2 is perpendicular to the crankshaft center direction C, and therefore the single intake port axis Cp passing through the cylinder center Oc represents the intake port axis for the respective intake port. The white arrows indicate the flow of the charge.

Figure 4:
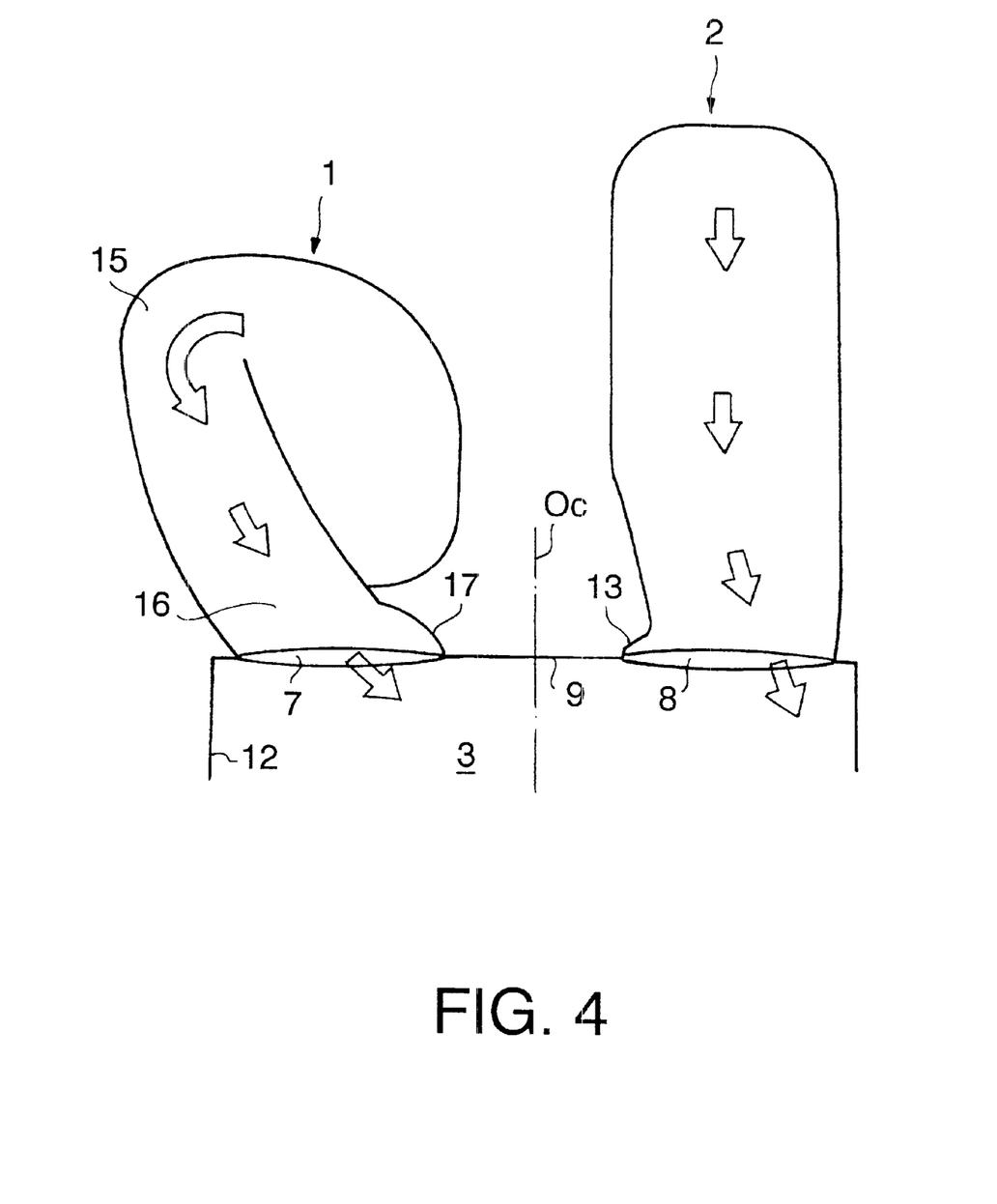
FIG. 4 is a front view of the same.

This engine is a direct-injection-type diesel engine having a plurality of cylinders 3 aligned in the crankshaft center C direction. The first intake port 1 and second intake port 2 are also disposed generally parallel but apart in the crankshaft center C direction. The inlets 4 and 5 of these ports have a square shape and open into the cylinder head side wall 6 respectively. The outlets 7 and 8 of the intake ports 1 and 2 have a rounded shape and open into the cylinder top wall 9 (FIG. 4). The outlets 7 and 8 are opened and closed by poppet type intake valves as shown in FIG. 10, and face downward substantially in the cylinder center Oc direction. The valve stems 10 of the intake valves are only shown as imaginary lines. Inside the cylinder 3, the outlet 7 of the first intake port 1 is located on the upstream of the swirl S, while the outlet 8 of the second intake port 2 is located on the downstream side of the swirl S. The entire first intake port 1 is located upstream of the entire second intake port 2 in the swirl S direction. The outlets 7 and 8 are equidistant from the crankshaft center C.

The second intake port 2 is a so-called straight tangential port. Specifically, as shown in FIG. 1, in plan view it extends linearly in the intake port axis Cp direction from the inlet 5 to the outlet 8, so that the charge is injected in the swirl tangential direction. Near the outlet 8, however, the second intake port 2 is constricted so as to have a passage on the opposite side from the first intake port 1. In other words, the inner wall 11 of the second intake port 2 located on the first intake port 1 side gradually extends toward the right in the drawing during a particular section near the downstream end of the second intake port 2, and as a result the port center line $C_2$ is steadily shifted to the outside in the cylinder radial direction. This biases the charge toward the cylinder inner wall 12 side.

Basically, after exiting the second intake port 2, the charge flows in the tangential direction of the swirl S and works to increase the swirl S, but the above-mentioned biasing near the outlet 8 particularly causes the charge to be sprayed toward the outside in the cylinder radial direction, contributing to swirl augmentation in this embodiment. Because the part immediately before the outlet 8 is deviated towards the outside in the cylinder radial direction with respect to the outlet 8, an umbrella-like portion 13 having an approximately crescent shape in plan view is provided to smoothly link this immediately preceding part to the circular outlet 8.

Figure 5:
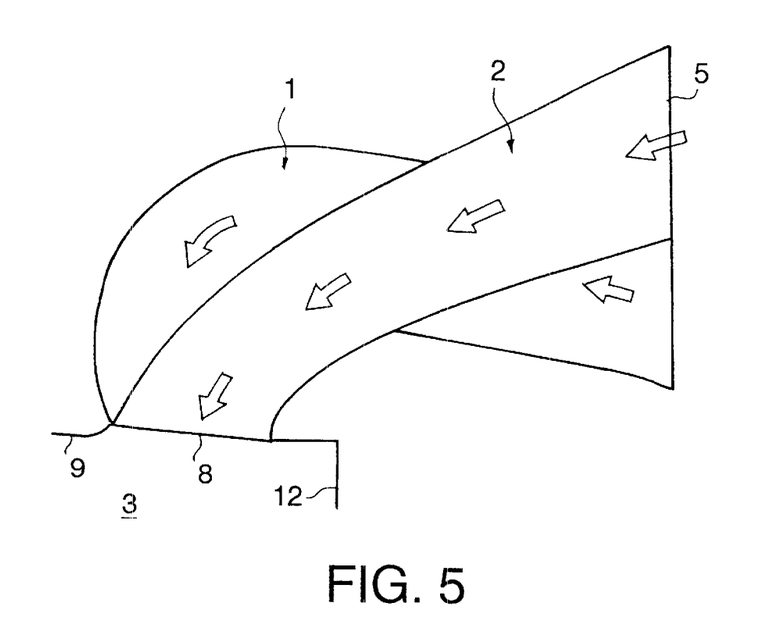
FIG. 5 is a right side view of the same.
Figure 6:
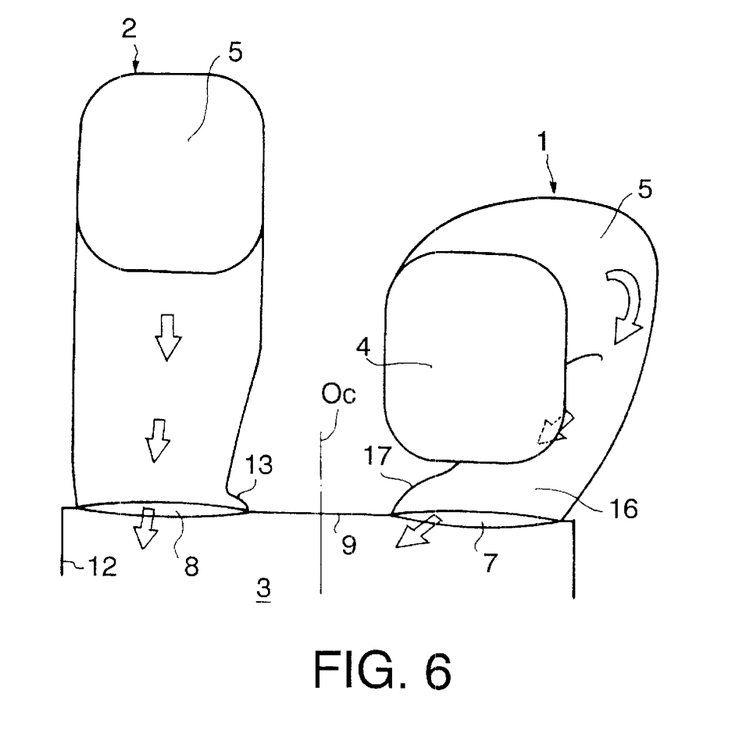
FIG. 6 is a rear view of the same.
Figure 7:
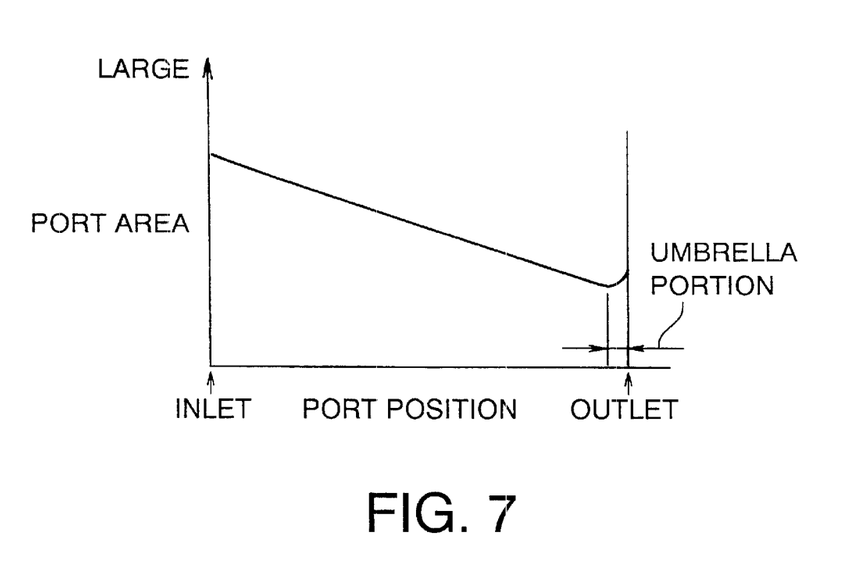
FIG. 7 is a graph showing relationship between the location and area of an intake port.

As shown in FIG. 5 in particular, the outlet 8 is located at a lower height than the inlet 5, and the second intake port 2 is gradually lowered from the inlet 5 toward the outlet 8. The angle of inclination of the second intake port 2 here is as close to horizontal as possible, so that no tumble flow is created and the swirl is enhanced by the charge resulting from the second intake port 2. The relationship between the port position and port area (cross section) of the second intake port 2 is as shown in FIG. 7. The port area steadily shrinks from the inlet 5, and expands sharply at the umbrella portion 13. This situation is the same as with an ordinary intake port. In other words, the air density is gradually increased as it flows in the intake port downstream, thereby preventing separation and turbulence within the port and injecting the charge all at once from the outlet. The inner surface of the second intake port 2 is a smooth surface over its entire length, with no protrusions.

Referring back to FIG. 1, the first intake port 1 includes the inlet 4, an inlet section 14 with a straight shape in plan view, a middle section 15 extending downstream from the inlet section 14 and protruding in a U-shape away from the second intake port with respect to the inlet section 14 (protruding to the left in the drawing), a part immediately before the outlet (referred to as "pre-outlet part" or "near-outlet part") 16 extending downstream from the middle section 15, the outlet 7, and an umbrella portion 17 that smoothly links the pre-outlet part 16 and the outlet 7. The inlet section 14 extends in the intake port axis Cp direction in plan view. The middle section 15 is U-shaped (or counterclockwise turned C-shape), gradually moving away from the second intake port 2 starting at the inlet section 14, and then moving back toward the second intake port 2. The U-shape is inclined with respect to the direction perpendicular to the direction of the axis Cp of the first intake port so that the turning bottom of the U-shape approaches the crankshaft center C or the cylinder center Oc. This inclination angle is indicated by α. With respect to the inlet section 14, the middle section 15 is offset away from the second intake port 2, and the maximum offset length L thereof is at least 0.5 W but no more than 0.75 W, where W is the inlet width.

As a result of the middle section 15 being curved in this fashion, the pre-outlet part 16 is oriented toward an area A between the outlet 8 of the second intake port and the cylinder inner wall 12a located upstream in the second intake port axial direction from the outlet 8. This is the hatched area A in FIG. 1. The pre-outlet part 16 is directed at a specific angle θ with respect to the first intake port axial direction from the location of the pre-outlet part 16 toward the inside of the cylinder 3. The pre-outlet part 16 is shaped such that its cross section perpendicular to the port center line $C_1$ is elliptical, i.e., flattened out. This cross sectional shape is hatched in the figure.

Figure 3:
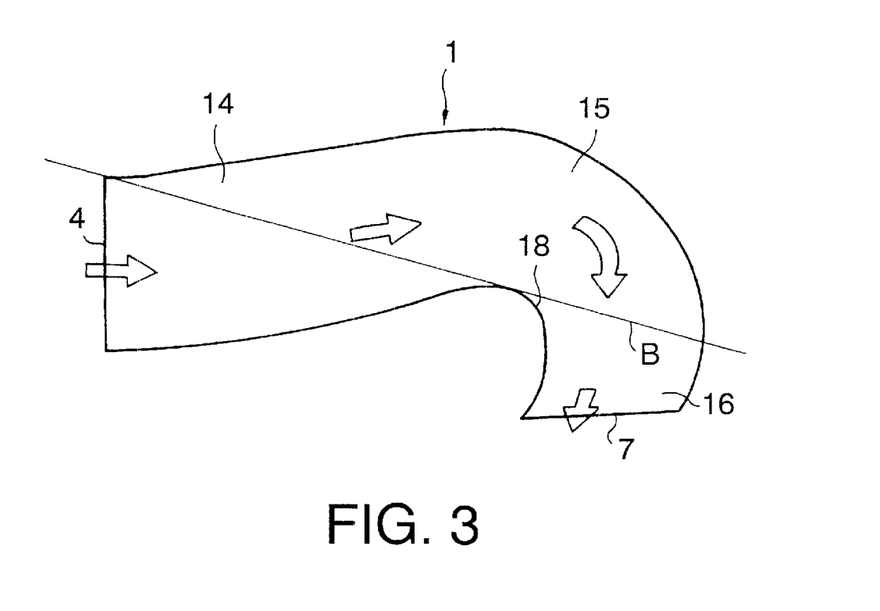
FIG. 3 is a left side view of the same.

As shown in FIG. 3 in particular, the outlet 7 is located at a lower height than the inlet 4. The first intake port 1 links the inlet 4 and the outlet 7, but the inlet section 14 extends slightly upward from the inlet 4, and then drops downward at the subsequent middle section 15. The middle section 15 is curved downward from the inlet side toward the outlet side. The inlet 4 of the first intake port 1 is located at a lower height than the inlet 5 of the second intake port 2.

The outlet 7 is invisible from the inlet 4. For example, regarding the height direction, the outlet 7 is formed below a line B passing through the inlet 4 upper end and touching the bottom corner wall 18 of the middle section 15. As a result, the charge does not escape straight from the inlet 4 to the outlet 7, and the orientation can always be varied by the middle section 15.

The relationship between the port position and port area of the first intake port 1 is also as shown in FIG. 7. The port area steadily shrinks from the inlet 4 up to the end of the pre-outlet part 16, and expands sharply at the umbrella portion 17 up to the area of the outlet 7. This gradually increases the air density in the first intake port 1 as it flows downstream, and allows the charge to be injected all at once at the outlet 7. The inner surface of the first intake port 1 is also a smooth surface that is free of protrusions.

As shown in FIG. 4, in front view, the rear half of the intermediate segment 15 and the near-outlet part 16 are inclined as close to horizontal as possible, allowing as much swirl component to be obtained as possible.

The action will now be described.

After passing through the inlet section 14, the charge curves in a U-shape along the middle section 15, and is injected from the outlet 7 in the direction defined by the near-outlet part 16. The outlet 7 faces down, but its length is negligible, so that the charge is injected in the orientation of the near-outlet part 16. As a result, the charge is injected in concentrated form toward the narrow area A. The area A is a dead space of the second intake port 2, and therefore the charge from the first intake port 1 does not interfere with the charge from the second intake port 2 in the area A. The charge of the first intake port 1 collides with the cylinder inner wall 12a (so that it can be said that the near-outlet part 16 is directed to the cylinder inner wall 12a), thereby accelerating the swirl S from the outermost peripheral position within the cylinder 3. As a result, the charges from the two ports do not cancel each other out, allowing for an effective increase in the swirl S.

The first intake port 1 changes the entire amount of the charge to the orientation of the near-outlet part 16 ahead of time, and injects the entire amount from its outlet 7 in this orientation. As mentioned above, the port area is gradually reduced and the air density is gradually raised, and further there are no protrusions on the port inner surface, the charge does not become turbulent or undergo separation midway, allowing the entire amount to be changed in its orientation along the port shape. Accordingly, there is no decrease in the effective port area, and a sufficient maximum charge amount can be obtained. Furthermore, since this entire amount is injected toward area A, the charge energy can be utilized to the maximum, affording greater swirl.

Because of this action and effect, the first intake port 1 could be called a third port which is definitely different from a known helical port and a tangential port.

Since the outlet 7 is invisible from the inlet 4, even if there is a great deal of valve lift, or if the charge flow rate is high, the charge will be prevented from escaping in the axis Cp direction of the first intake port 1, and a weakening of the swirl S will also be prevented.

Because the near-outlet part 16 has a flattened cross sectional shape as mentioned above, the charge can be injected in a wider rather than taller shape, which further enhances the swirl increasing effect.

In addition, the swirl is further strengthened as a whole by combination of the first and second intake ports 1 and 2. Specifically, the second intake port 2 injects the charge toward the outermost peripheral location within the cylinder 3, and accelerates the charge (or swirl S) from the first intake port 2 at that location. It should be noted that this second intake port 2 may be used by itself, since even then the swirl increasing effect will be better than with a conventional straight tangential port.

Figure 8:
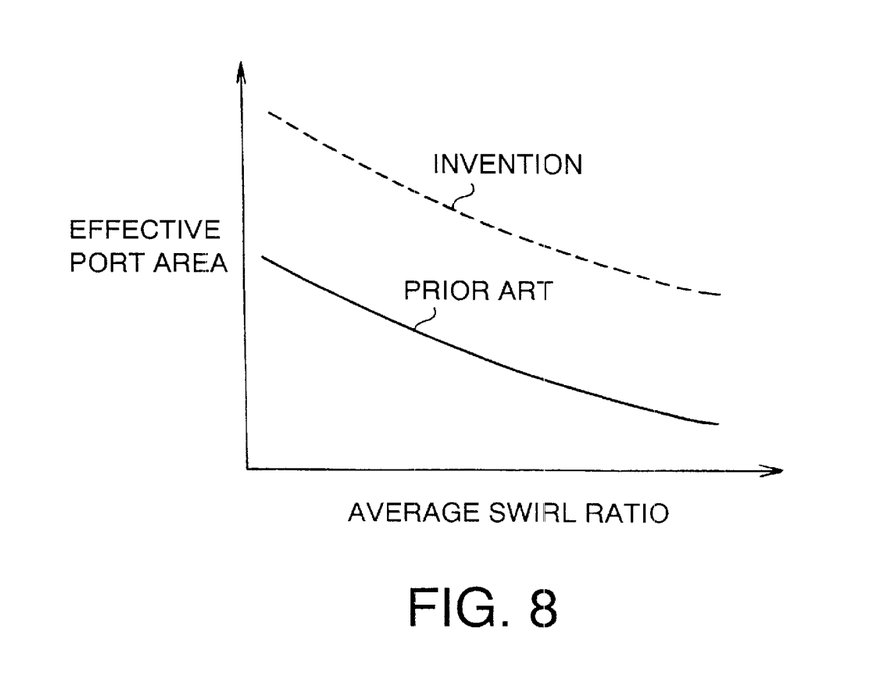
FIG. 8 is a graph of the relationship between the average swirl ratio and the effective port area, and illustrates a comparison of this embodiment to prior art.

The first intake port 1 was actually fabricated and tested, whereupon better results were obtained than with a conventional intake port, as shown in FIG. 8. Specifically, in the past, regardless of the shape of the port, the relationship between average swirl ratio and effective port area was constant, as indicated by the solid line. With the first intake port 1 discussed above, however, the average swirl ratio and effective port area were both better than the prior art. This means that a higher average swirl ratio will be obtained at a given flow rate, and a larger effective port area, that is, a higher intake efficiency and maximum charge amount, will be obtained at a given average swirl ratio. This confirmed the effectiveness of the first intake port 1, that is, achieving a high level for both intake amount and swirl.

It is best for the charge from the first intake port 1 to be injected toward area A, but in some cases it may be impossible to orient the first intake port 1 in that direction because of the layout or other such factors. In such a case, the charge may be injected toward the outlet 8 of the second intake port 2. If so, there will be charge interference and the swirl increasing effect will drop somewhat, but the maximum intake amount will be sufficiently obtained for the first intake port 1. Also, it is still possible to accelerate the swirl S because the charge from the first intake port 1 after interference collides with the cylinder inner wall 12a and flows along this cylinder inner wall 12a. In this embodiment, however, there is believed to be very little charge interference because the charge from the outlet 8 of the second intake port 2 is injected downward at an angle toward the crankshaft center C. With this in mind as well, it is preferable for the angle θ to be at least 90° but no more than 150°.

Meanwhile, demand for smaller engines has been on the rise in recent years. For instance, small, direct injection type diesel engines with a displacement of less than 500 cc per cylinder (2000 ml/4 cylinders) have been developed. Because of the small bore diameter with such small engines, there is limited layout space for the intake ports. However, the intake port structure of this embodiment is extremely compact so that it can be easily employed in these smaller engines.

Engines employing a variable valve timing (VVT) mechanism on the intake side have also been noted recently. In such case, the cam shaft and the crankshaft axes must be laid out in parallel, and the intake valves aligned in the cam shaft direction. The intake port outlets 7 and 8 in this embodiment are lined up in the crankshaft center C direction, so such a layout is possible, and VVT can therefore be employed with ease.

Another embodiment of the present invention will now be described.

Figure 12:
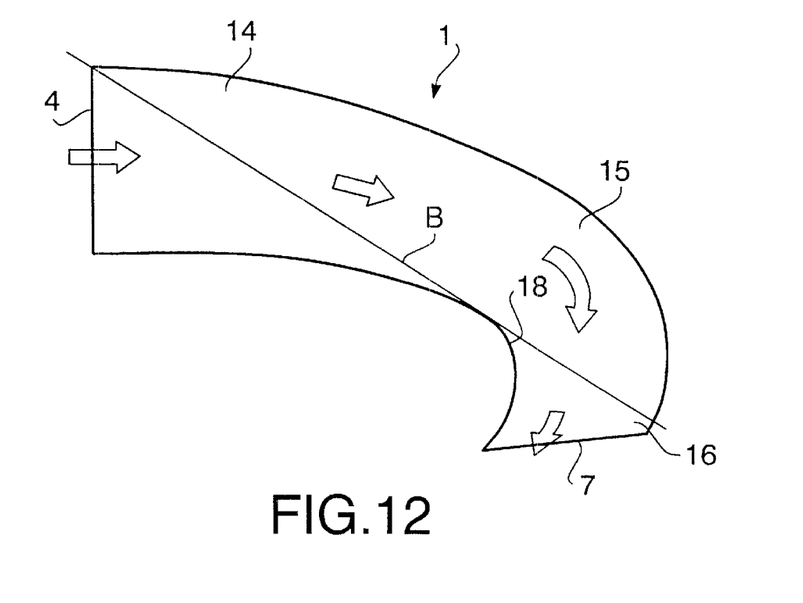
FIG. 12 illustrates a left side view of the engine shown in FIG. 11.
Figure 13:
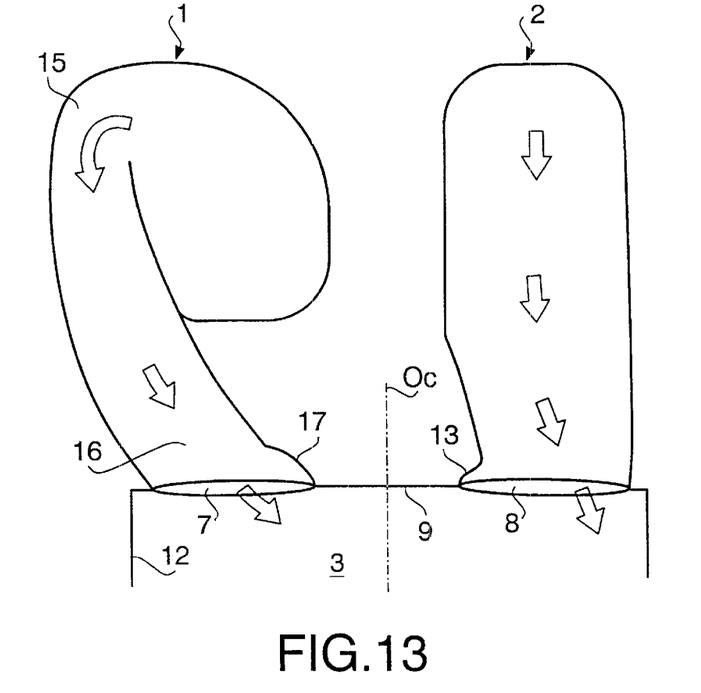
FIG. 13 illustrates a front view of the same.
Figure 14:
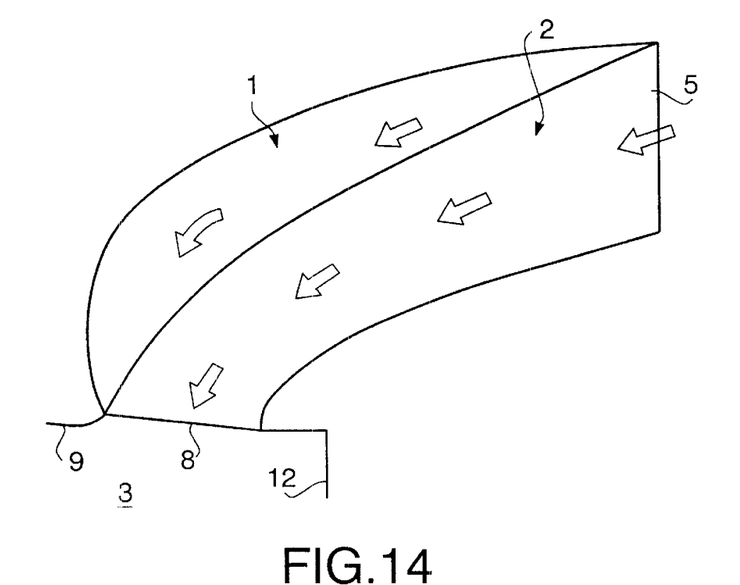
FIG. 14 illustrates a right side view of the same.
Figure 15:
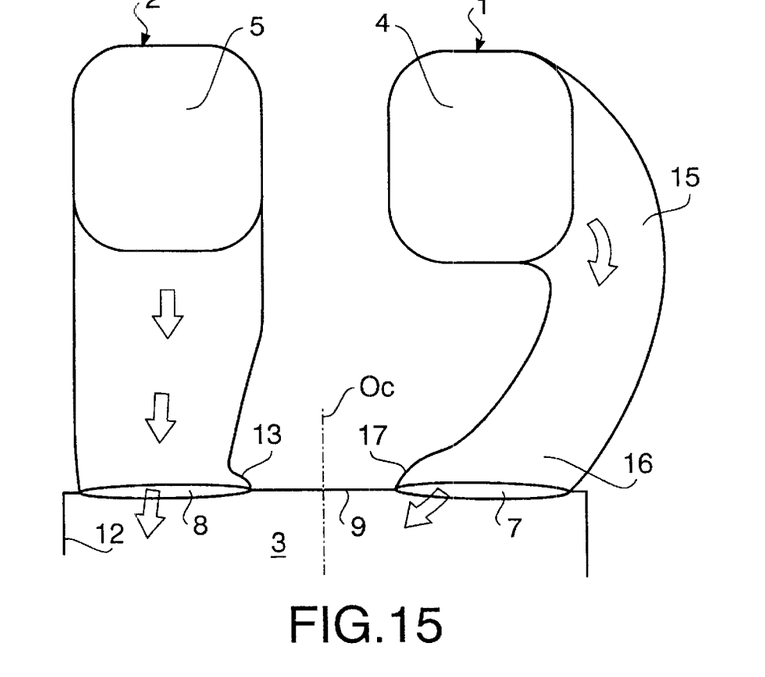
FIG. 15 illustrates a rear view of the same.

As shown in FIGS. 11 to 15, in this embodiment the inlet 4 of the first intake port 1 is located at the same height location as the inlet 5 of the second intake port 2. The plan view is the same as FIG. 1. The height location of the inlet 4 of the first intake port 1 is changed to a higher location as compared with the first embodiment. As a result, the inlet section 14 descends gently downstream as shown in FIG. 12, and the curvature of the middle section 15 is decreased. Everything else is the same as in the first embodiment, and those components that are the same in the figures are labeled the same reference numerals and will not be described again.

Figure 16:
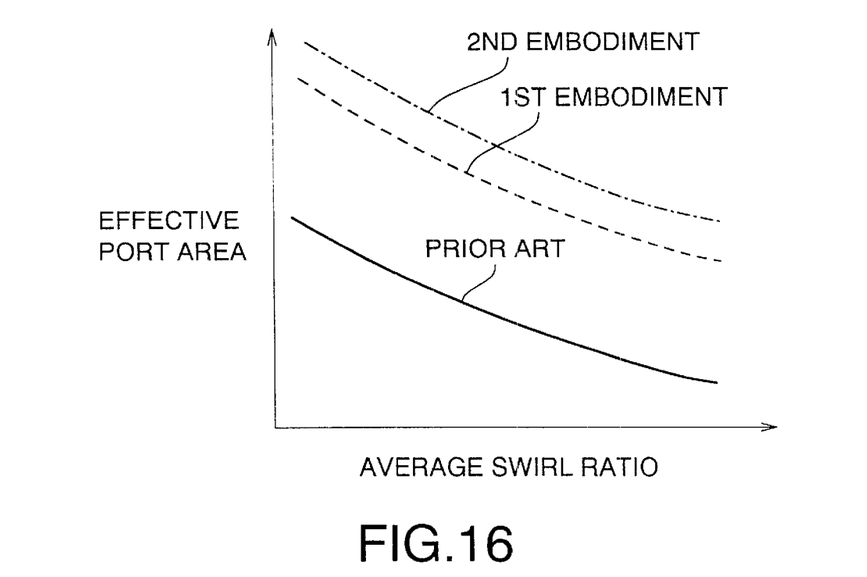
FIG. 16 is a graph of the relationship between the average swirl ratio and the effective port area, and illustrates a comparison of the other embodiment, the above-mentioned embodiment, and prior art.

The same operation and effect are obtained with this second embodiment as with the first embodiment. The first intake port 1 of the second embodiment was actually fabricated and tested, whereupon the results were actually better than in the first embodiment, as shown in FIG. 16. It was also confirmed from this test that the angle θ and the maximum offset length L are particularly important values.

Figure 17:
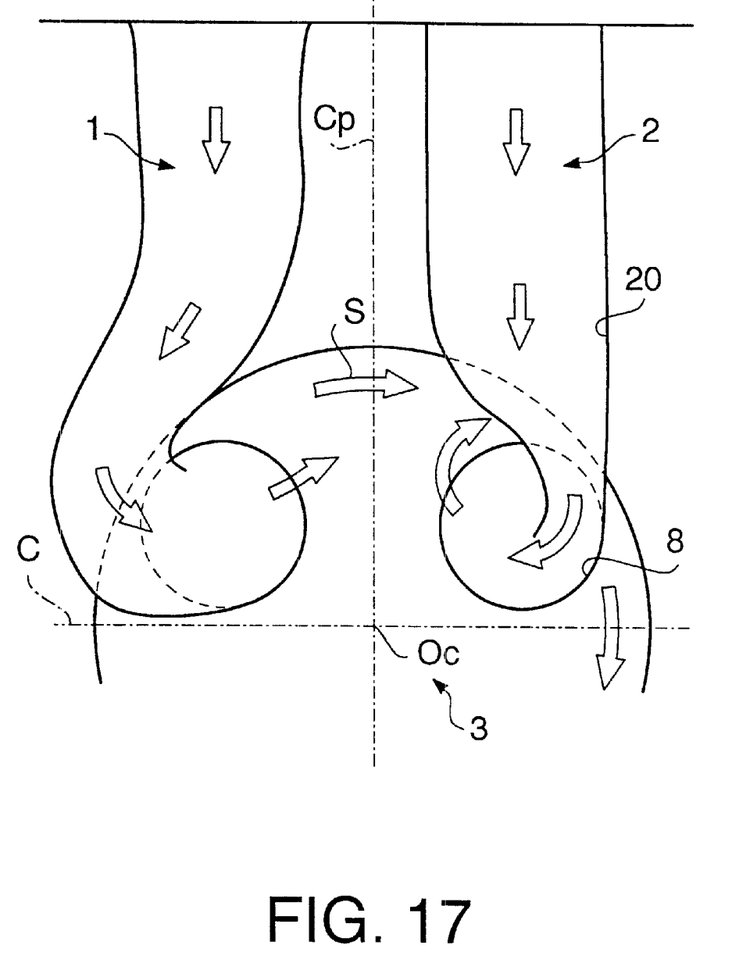
FIG. 17 depicts a plan view of a multiple intake valve engine pertaining to another embodiment of the present invention.

Referring to FIG. 17, illustrated is a third embodiment of which second intake port 2 is a helical port. With this second intake port 2, the passage ahead of the outlet 8 is constricted so that there will be a passage on the opposite side from the first intake port 1, and this portion is formed in a helical or spiral shape. The spiral flow injected from the outlet 8 has a rotation component in the same direction as the swirl S. The inner wall 20 located on the opposite side from the first intake port 1 extends straight ahead in the intake port axis Cp direction until the outlet 8, so that it does not stick out of the cylinder. When this helical port is used, the swirl increasing action of the first intake port 1 combines to produce the same operation and effect as in the above embodiments. It should be noted here that the height locations of the inlet 4 of the first intake port 1 and the inlet 5 of the second intake port 2 may be the same or different. Further, the shape of the helical port and the type of the second intake port itself are not particularly restricted to those discussed above.

Other embodiments of the present invention are also possible. For instance, the engine can be a gasoline engine, or the number of valves per cylinder can be changed (such as three valves).

To summarize the above, the effect of the present invention is that a powerful swirl can be generated under any circumstances, and high levels can be achieved for both the intake amount and swirl.

The illustrated and described multiple intake valve engine is disclosed in Japanese Patent Application Nos. 11-367404 and 2000-263246 filed on Dec. 24, 1999 and Aug. 28, 2000 respectively in JPO, and the instant application claims priority of these two Japanese Patent Applications, the entire disclosures of which are incorporated herein by reference.

What is claimed is:

1. A multiple intake valve engine comprising:
a first intake port having a first outlet; and
a second intake port having a second outlet and being provided downstream of the first intake port with respect to a swirl generated in each cylinder of an engine, and wherein a near-outlet part of the first intake port immediately before the first outlet is directed toward a cylinder inner wall in an upstream vicinity of the second intake port outlet;
wherein the first outlet of the first intake port and the second outlet of the second intake port are positioned at an air intake side relative to a crankshaft center.

2. The multiple intake valve engine according to claim 1, wherein the first intake port has an inlet section extending downstream from a first inlet of the first intake port, and a middle section extending downstream from the inlet section to the near-outlet part, and the middle section curves in a clockwise-turned U-shape and protrudes with respect to the inlet section in a direction away from the second intake port.

3. The multiple intake valve engine according to claim 2, wherein a turning bottom of the U-shape of the middle section is relatively close to a cylinder center.

4. The multiple intake valve engine according to claim 2, wherein a maximum offset length of the middle section, which is defined by protrusion of the U-shape with respect to the inlet section, is at least 0.5 W but no more than 0.75 W, where W is a width of the first inlet.

5. The multiple intake valve engine according to claim 1, wherein an inner surface of the first intake port is formed as a smooth surface over its entire length.

6. The multiple intake valve engine according to claim 1, wherein a cross sectional shape of the near-outlet part is flattened out.

7. The multiple intake valve engine according to claim 1, wherein the second intake port is a straight tangential port, and in the vicinity of the second outlet thereof, the second intake port is constricted so as to have a passage inclined on the opposite side from the first intake port.

8. The multiple intake valve engine according to claim 1, wherein the second intake port is a helical port.

9. The multiple intake valve engine according to claim 1, wherein the first intake port includes a downwardly curved middle section extending between a first inlet and first outlet of the first intake port, and said first outlet is formed below a straight line passing through an uppermost point of the first inlet and touching a lowermost corner point defined by the curved middle section.

10. The multiple intake valve engine according to claim 1, wherein a height location of the first inlet of the first intake port is lower than or equal to a height location of a second inlet of the second intake port.

11. A multiple intake valve engine comprising:
a first intake port having a first outlet; and
a second intake port having a second outlet and being provided downstream of the first intake port with respect to a swirl generated in a respective cylinder of the engine, and wherein a near-outlet part of the first intake port immediately before the first outlet is oriented at an angle of at least 90° but no more than 150°, the angle being measured with respect to an axial direction of the first intake port.

12. The multiple intake valve engine according to claim 11, wherein the first intake port has an inlet section extending downstream from a first inlet of the first intake port, and a middle section extending downstream from the inlet section to the near-outlet part, and the middle section curves in a clockwise-turned U-shape and protrudes with respect to the inlet section in a direction away from the second intake port.

13. The multiple intake valve engine according to claim 12, wherein a turning bottom of the U-shape of the middle section is relatively close to a cylinder center.

14. The multiple intake valve engine according to claim 12, wherein a maximum offset length of the middle section, which is defined by protrusion of the U-shape with respect to the inlet section, is at least 0.5 W but no more than 0.75 W, where W is a width of the first inlet.

15. The multiple intake valve engine according to claim 11, wherein an inner surface of the first intake port is formed as a smooth surface over its entire length.

16. The multiple intake valve engine according to claim 11, wherein a cross sectional shape of the near-outlet part is flattened out.

17. The multiple intake valve engine according to claim 11, wherein the second intake port is a straight tangential port, and in the vicinity of the second outlet thereof, the second intake port is constricted so as to have a passage deflected on the opposite side from the first intake port.

18. The multiple intake valve engine according to claim 11, wherein the second intake port is a helical port.

19. The multiple intake valve engine according to claim 11, wherein the first intake port includes a downwardly curved middle section extending between a first inlet and first outlet of the first intake port, and said first outlet is formed below a straight line passing through an uppermost point of the first inlet and touching a lowermost corner point defined by the curved middle section.

20. The multiple intake valve engine according to claim 11, wherein a height location of the first inlet of the first intake port is lower than or equal to a height location of a second inlet of the second intake port.

21. A multiple intake valve engine comprising:

a first intake port having a first inlet, a first outlet and a downwardly curved middle section between the first inlet and outlet, and the first outlet being formed below a straight line passing through an uppermost point of the first inlet and touching a lowermost corner point defined by the curved middle section; and a second intake port having a second outlet and being provided downstream of the first intake port with respect to a swirl generated in a respective cylinder of an engine.

22. The multiple intake valve engine according to claim 21, wherein a height location of the first inlet of the first intake port is lower than or equal to a height location of a second inlet of the second intake port.

23. A multiple intake valve engine comprising:

a first intake port having a first outlet; and a second intake port having a second outlet and being provided downstream of the first intake port with respect to a swirl generated in a respective cylinder, wherein said second intake port is a straight tangential port, and in the vicinity of the second outlet, the second intake port is constricted so as to have a passage deflected on the opposite side from the first intake port.

24. The multiple intake valve engine according to claim 23, wherein a height location of the first inlet of the first intake port is lower than or equal to a height location of a second inlet of the second intake port.

* * * * *